(12) United States Patent
Kobayashi et al.

(10) Patent No.: US 9,104,053 B2
(45) Date of Patent: Aug. 11, 2015

(54) LIQUID CRYSTAL DISPLAY AND PROJECTION DISPLAY

(71) Applicant: Sony Corporation, Tokyo (JP)

(72) Inventors: Hiroshi Kobayashi, Kanagawa (JP); Kouichi Oomura, Kanagawa (JP); Yoshihiro Mizuguchi, Kumamoto (JP); Yoshihiro Hirakawa, Kumamoto (JP); Daishi Takaki, Kumamoto (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/075,220

(22) Filed: Nov. 8, 2013

(65) Prior Publication Data

US 2014/0139753 A1    May 22, 2014

(30) Foreign Application Priority Data

Nov. 21, 2012  (JP) ................. 2012-254901

(51) Int. Cl.
  *G02F 1/1333*    (2006.01)
  *G03B 21/00*    (2006.01)
  *H04N 9/31*    (2006.01)
(52) U.S. Cl.
  CPC ........ *G02F 1/133308* (2013.01); *G03B 21/006* (2013.01); *H04N 9/3152* (2013.01); *G02F 2001/133314* (2013.01)

(58) Field of Classification Search
  USPC .......................................................... 349/58
  See application file for complete search history.

(56) References Cited

U.S. PATENT DOCUMENTS

| 5,126,863 | A  | * | 6/1992 | Otsuka et al. ................. 349/95 |
| 5,540,998 | A  | * | 7/1996 | Yamada et al. ............. 428/411.1 |
| 5,835,179 | A  | * | 11/1998 | Yamanaka .................... 349/161 |
| 2008/0192167 | A1 | * | 8/2008 | Maeda ............................ 349/58 |
| 2010/0253874 | A1 | * | 10/2010 | Ito et al. ......................... 349/58 |

FOREIGN PATENT DOCUMENTS

| JP | 2004-045680 | 2/2004 |
| JP | 2006-018055 | 1/2006 |

* cited by examiner

*Primary Examiner* — Lucy Chien
(74) *Attorney, Agent, or Firm* — Dentons US LLP

(57) ABSTRACT

A liquid crystal display includes: a liquid crystal panel containing an effective pixel region that is configured to emit light corresponding to an image; and a frame member provided on a light emission side of the liquid crystal panel, and having an opening opposed to the effective pixel region of the liquid crystal panel. An edge portion of the opening of the frame member is formed of a low-reflection material having a reflectance of less than about 1.5% to green light.

8 Claims, 14 Drawing Sheets

LIQUID CRYSTAL DISPLAY AND PROJECTION DISPLAY

CROSS REFERENCE TO RELATED APPLICATIONS

This application claims the benefit of Japanese Priority Patent Application JP 2012-254901 filed Nov. 21, 2012, the entire contents of which are incorporated herein by reference.

BACKGROUND

The present disclosure relates to a liquid crystal display and a projection display for use in a light-valve-type projector.

In a common projection display for use in a projector etc., an image is produced through modulation by a transmissive (or reflective) liquid crystal panel based on light emitted from a light source, and is displayed in an enlarged manner by a projection lens. A frame member (an outer frame) is attached to a light emission side of the liquid crystal panel in order to install the liquid crystal panel within the projection display. The outer frame has an opening (a window) opposed to an effective pixel region of the liquid crystal panel, and light is extracted to a projection lens side through the opening (for example, see Japanese Unexamined Patent Application Publication Nos. 2006-018055 and 2004-045680).

SUMMARY

Unfortunately, in the projection image display described in each of Japanese Unexamined Patent Application Publication Nos. 2006-018055 and 2004-045680, light emitted from the liquid crystal panel is influenced by the frame member, and thus an edge portion or a circuit section is reflected in a display image, which disadvantageously degrades image quality of a display image.

It is desirable to provide a liquid crystal display and a projection display capable of suppressing occurrence of degradation in image quality caused by a frame member provided on a light emission side of a liquid crystal panel.

According to an embodiment of the present disclosure, there is provided a liquid crystal display (1) including: a liquid crystal panel containing an effective pixel region that is configured to emit light corresponding to an image; and a frame member provided on a light emission side of the liquid crystal panel, and having an opening opposed to the effective pixel region of the liquid crystal panel. An edge portion of the opening of the frame member is formed of a low-reflection material having a reflectance of less than about 1.5% to green light.

According to an embodiment of the present disclosure, there is provided a liquid crystal display (2) including: a liquid crystal panel containing an effective pixel region that is configured to emit light corresponding to an image; and a frame member provided on a light emission side of the liquid crystal panel, and having an opening opposed to the effective pixel region of the liquid crystal panel. An edge portion of the opening of the frame member has a slope facing a light emission surface of the liquid crystal panel.

According to an embodiment of the present disclosure, there is provided a projection display (1) including: a light source; a liquid crystal panel containing an effective pixel region that is configured to modulate light from the light source to emit light corresponding to an image; a frame member provided on a light emission side of the liquid crystal panel, and having an opening opposed to the effective pixel region of the liquid crystal panel; and a projection lens projecting the image based on light emitted from the liquid crystal panel. An edge portion of the opening of the frame member is formed of a low-reflection material having a reflectance of less than about 1.5% to green light.

According to an embodiment of the present disclosure, there is provided a projection display (2) including: a light source; a liquid crystal panel containing an effective pixel region that is configured to modulate light from the light source to emit light corresponding to an image; a frame member provided on a light emission side of the liquid crystal panel, and having an opening opposed to the effective pixel region of the liquid crystal panel; and a projection lens projecting the image based on light emitted from the liquid crystal panel. An edge portion of the opening of the frame member has a slope facing a light emission surface of the liquid crystal panel.

In the liquid crystal display (1) and the projection display (1) according to the above-described respective embodiments of the disclosure, the edge portion of the opening of the frame member, which is provided on the light emission side of the liquid crystal panel, is formed of the low-reflection material having the reflectance of less than 1.5% to green light. Therefore, an amount of light reflected by the edge portion of the frame member, of light emitted from the liquid crystal panel, is decreased, which results in a reduction in reflection in a display image caused by such reflected light.

In the liquid crystal display (2) and the projection display (2) according to the above-described respective embodiments of the disclosure, the edge portion of the opening of the frame member, which is provided on the light emission side of the liquid crystal panel, has the slope facing the light emission surface of the liquid crystal panel. Therefore, an optical path of light reflected by the edge portion of the frame member, of light emitted from the liquid crystal panel, is changed, which results in a reduction in reflection in a display image caused by such reflected light.

In the present disclosure, "reflectance" refers to a ratio of energy of reflected light to energy of incident light (energy of reflected light/energy of incident light) in percentage when light perpendicularly enters a surface of an object from a vacuum.

According to the liquid crystal display (1) and the projection display (1) of the above-described respective embodiments of the disclosure, the edge portion of the opening of the frame member, which is provided on the light emission side of the liquid crystal panel, is formed of the low-reflection material having the reflectance of less than about 1.5% to green light. Thus, an amount of light reflected by the edge portion of the frame member, of light emitted from the liquid crystal panel, is decreased, which makes it possible to reduce reflection in a display image. Consequently, it is possible to suppress occurrence of degradation in image quality due to the frame member provided on the light emission side of the liquid crystal panel.

According to the liquid crystal display (2) and the projection display (2) of the above-described respective embodiments of the disclosure, the edge portion of the opening of the frame member, which is provided on the light emission side of the liquid crystal panel, has the slope facing the light emission surface of the liquid crystal panel. Therefore, an optical path of light reflected by the edge portion of the frame member, of light emitted from the liquid crystal panel, is changed, which makes it possible to reduce reflection in a display image. Consequently, it is possible to suppress occurrence of degradation in image quality due to the frame member provided on the light emission side of the liquid crystal panel.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, an embodiment of the present disclosure will be described in detail with reference to the accompanying drawings. It is to be noted that description is made in the following order.

1. Embodiment (An example of a projection display in which a low-reflection material is used for an edge portion of an outer frame of a liquid crystal display device, and a slope (plane) is provided in the edge portion).

2. Modification 1 (An exemplary case where a slope of an edge portion of an outer frame is a curved surface).

3. Modification 2 (An exemplary case where an edge portion of an outer frame is designed to be equal to or lower than a predetermined height).

[Embodiment]
[Configuration]

Figure 1:
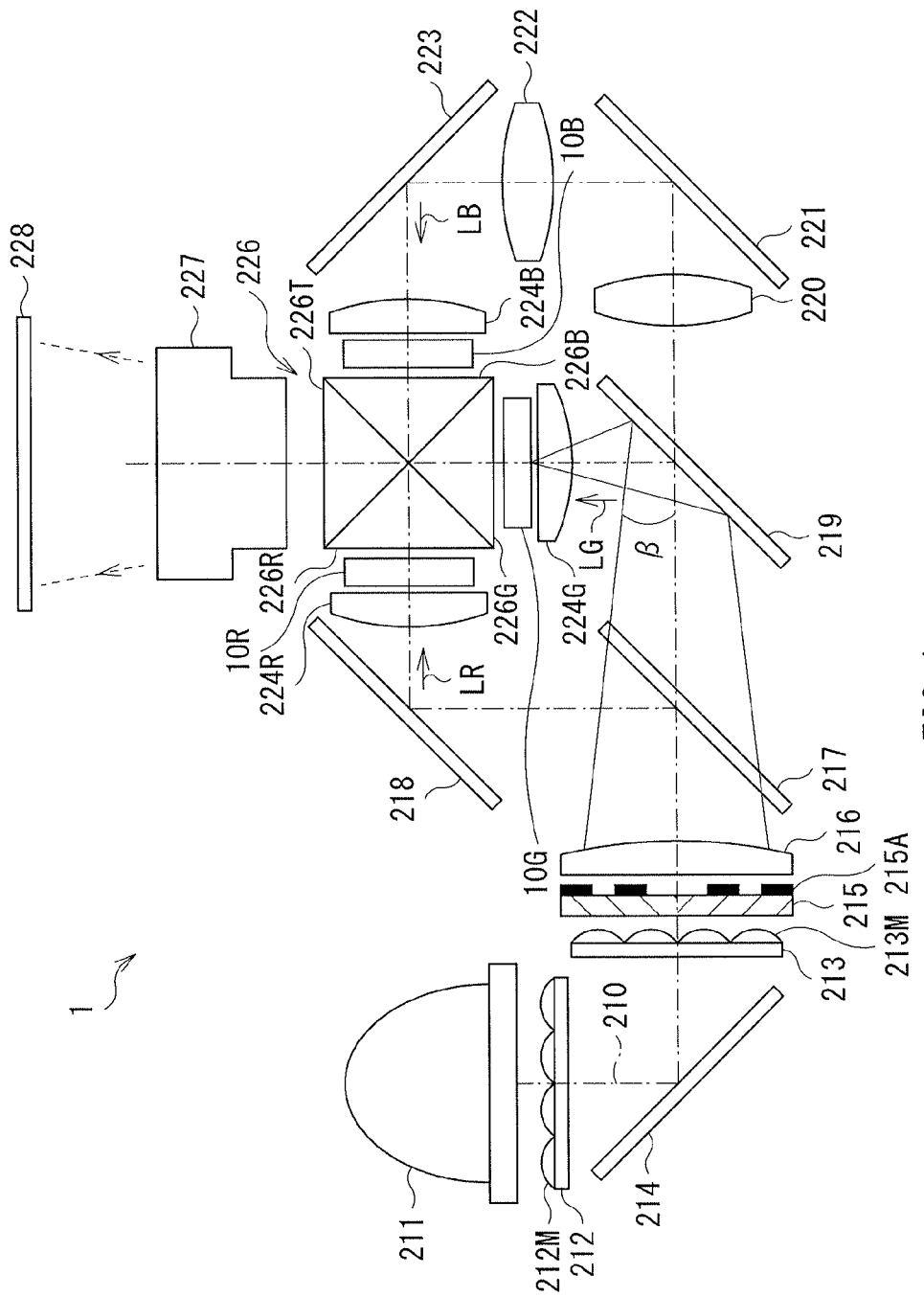
FIG. 1 is a diagram illustrating a general configuration of a projection display according to one embodiment of the present disclosure.

FIG. 1 illustrates a schematic configuration of a projection display 1 (projection display) according to one embodiment of the present disclosure. The projection display 1 is used as a projector incorporating a liquid crystal display according to an embodiment of the present disclosure as a liquid crystal display unit. The projection display 1 is of a so-called three-plate type in which three sheets of transmissive liquid crystal display units 10 (10R, 10G, and 10B) are used for color image display. The projection display 1 includes a light source 211 configured to emit light, a pair of first and second multi-lens array integrators 212 and 213, and a total reflection mirror 214 that is provided between the multi-lens array integrators 212 and 213, and is disposed to allow an optical path (an optical axis 210) to be bent substantially 90 degrees toward the second multi-lens array integrator 213. In the multi-lens array integrators 212 and 213, a plurality of microlenses 212M and 213M are two-dimensionally arranged, respectively. Each of the multi-lens array integrators 212 and 213 is to homogenize light illuminance distribution, and has a function of splitting incident light into a plurality of small beams.

The light source 211 is configured to emit white light containing red light, blue light, and green light necessary for color image display. For example, the light source 211 may include a light emitting body (not shown) configured to emit white light, and a concave mirror that reflects and concentrates light emitted from the light emitting body. Examples of the light emitting body may include a halogen lamp, a metal halide lamp, and a xenon lamp. The concave mirror may desirably have a shape giving a high light gathering efficiency, and, for example, may be a spheroidal mirror or a paraboloid-of-revolution mirror etc. having a rotationally symmetric surface shape.

The projection display 1 further includes a PS synthesizing element 215, a condenser lens 216, and a dichroic mirror 217 in this order on a light emission side of the second multi-lens array integrator 213. The dichroic mirror 217 has a function of separating incident light into red light LR and other color light, for example.

The PS synthesizing element 215 has a plurality of half-wave plates 215A at positions corresponding to points between adjacent microlenses of the second multi-lens array integrator 213. The PS synthesizing element 215 has a function of separating incident light LO into two types (the P polarization component and the S polarization component) of polarized light L1 and L2. Moreover, the PS synthesizing element 215 has a function of emitting one polarized light L2 of the separated two types of polarized light L1 and L2 while maintaining a polarization direction (for example, P polarization) of the polarized light L2, and of converting the other polarized light L1 (for example, the S polarization component) into the other polarization component (for example, the P polarization component) by the effect of the half-wave plate 215A and emitting the converted polarized light.

The projection display 1 includes a total reflection mirror 218, a field lens 224R, and a liquid crystal display unit 10R in sequence along an optical path of red light LR produced through separation by the dichroic mirror 217. The total reflection mirror 218 reflects the red light LR produced through separation by the dichroic mirror 217 toward the liquid crystal display unit 10R. The liquid crystal display unit 10R has a function of spatially modulating the red light LR entering through the field lens 224R based on image signals.

The projection display 1 further includes a dichroic mirror 219 along an optical path of other color light produced through separation by the dichroic mirror 217. The dichroic mirror 219 has a function of separating incident light into green light and blue light, for example.

The projection display 1 further includes a field lens 224G and a liquid crystal display unit 10G in sequence along an optical path of green light LG produced through separation by the dichroic mirror 219. The liquid crystal display unit 10G has a function of spatially modulating the green light LG entering through the field lens 224G based on image signals. Furthermore, the projection display 1 includes a relay lens 220, a total reflection mirror 221, a relay lens 222, a total reflection mirror 223, a field lens 224B, and a liquid crystal display unit 10B in sequence along an optical path of blue light LB produced through separation by the dichroic mirror 219. The total reflection mirror 221 reflects the blue light LB that has entered the total reflection mirror 221 through the relay lens 220, toward the total reflection mirror 223. The total reflection mirror 223 reflects the blue light LB, which is reflected by the total reflection mirror 221 and then enters the total reflection mirror 223 through the relay lens 222, toward the liquid crystal display unit 10B. The liquid crystal display unit 10B has a function of spatially modulating the blue light LB, which is reflected by the total reflection mirror 223 and enters through the field lens 224B, based on image signals.

The projection display 1 further includes a cross prism 226 having a function of synthesizing three colors of light LR, LG, and LB at a position where the optical paths of the red light LR, the green light LG, and the blue light LB intersect with one another. The projection display 1 further includes a projection lens 227 for projecting synthesized light emitted from the cross prism 226 toward a screen 228. The cross prism 226 includes three incidence surfaces 226R, 226G, and 226B and one emission surface 226T. The red light LR emitted from the liquid crystal display unit 10R enters the incidence surface 226R, the green light LG emitted from the liquid crystal display unit 10G enters the incidence surface 226G, and the blue light LB emitted from the liquid crystal display unit 10B enters the incidence surface 226B. The cross prism 226 synthesizes the three colors of light entering the incidence surfaces 226R, 226G, and 226B and emits the synthesized light from the emission surface 226T.

(Liquid Crystal Display Unit 10)

Figure 2:
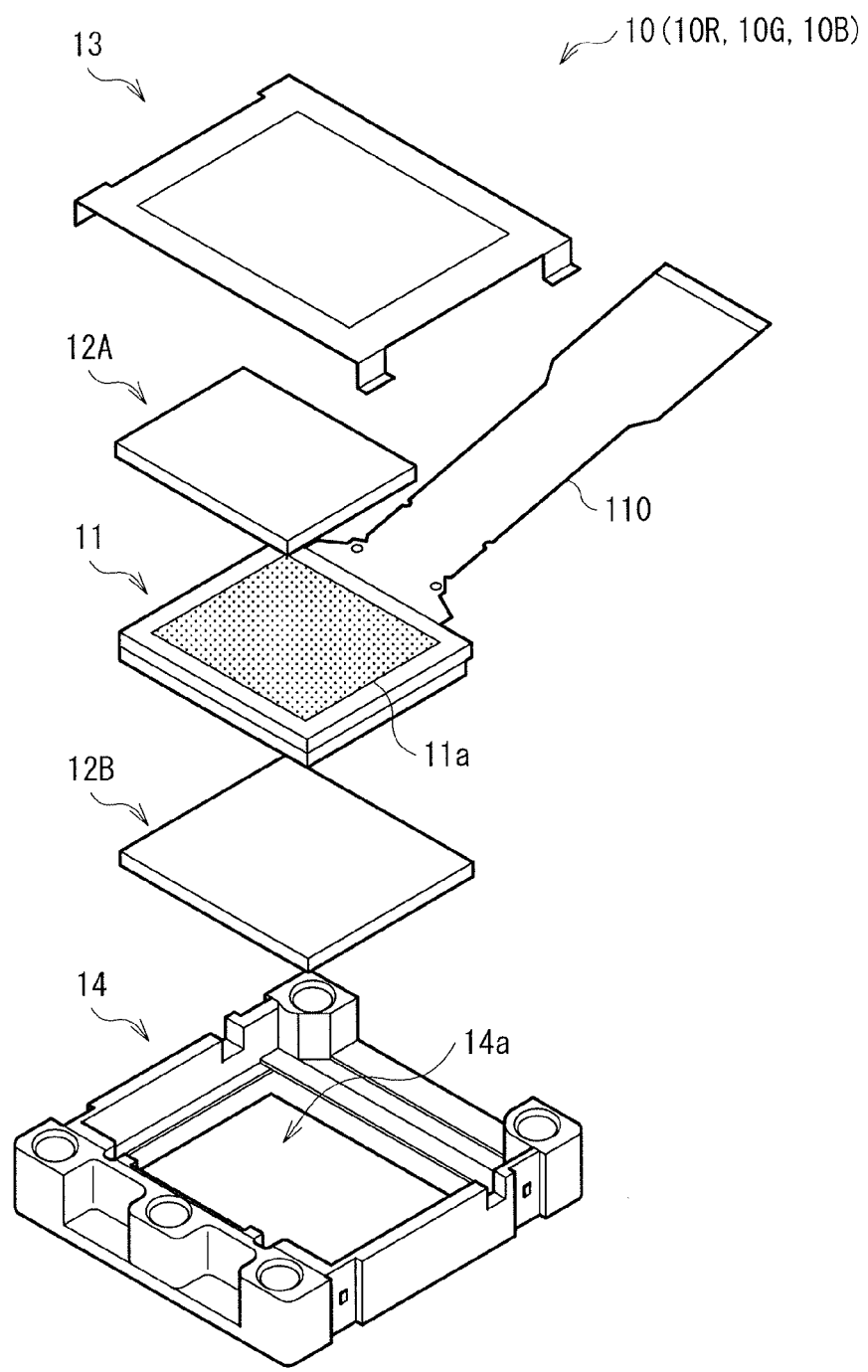
FIG. 2 is an exploded perspective diagram of a liquid crystal display device illustrated in FIG. 1.
Figure 3:
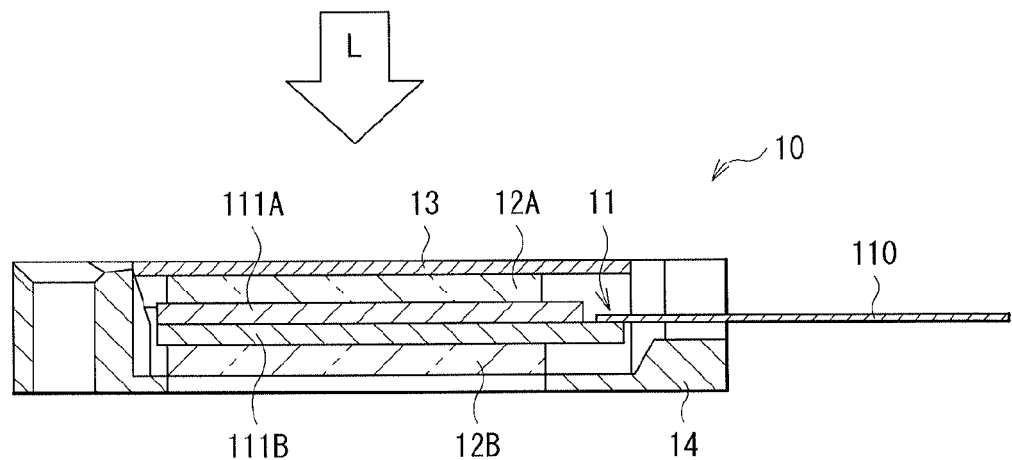
FIG. 3 is a cross-sectional diagram of the liquid crystal display device illustrated in FIG. 1.

FIG. 2 illustrates a relevant part of one of the liquid crystal display units 10R, 10G, and 10B (hereinafter, simply referred to as "liquid crystal display unit 10" unless color distinction is necessary) in an exploded manner. FIG. 3 illustrates a sectional configuration of the liquid crystal display unit 10. The liquid crystal display unit 10 includes a liquid crystal panel 11, an outer frame 14 (frame member) accommodating or holding the liquid crystal panel 11, and a parting plate 13.

The liquid crystal panel 11 serves as a so-called light valve, and has an effective pixel region 11a configured to modulate light from the light source 211 to emit light corresponding to an image. The liquid crystal panel 11 includes a pair of glass plates 111A and 111B and liquid crystal (not shown) enclosed between the glass plates. The liquid crystal panel 11 is connected with a film substrate 110 through which image information necessary for modulation of incident light is supplied from a main body of the projection display 1 to the liquid crystal panel 11. An incidence-side dustproof glass 12A is bonded to a light incidence side of the liquid crystal panel 11, while an emission-side dustproof glass 12B is bonded to a light emission side thereof. The parting plate 13 is attached to an incidence surface side of the liquid crystal panel 11, and has an opening (window) 14a opposed to the effective pixel region 11a of the liquid crystal panel 11. The outer frame 14 is attached to a light emission side of the liquid crystal panel 11, and has a frame shape enclosing any end face portion of the liquid crystal panel 11.

(Outer Frame 14)

Figure 4:
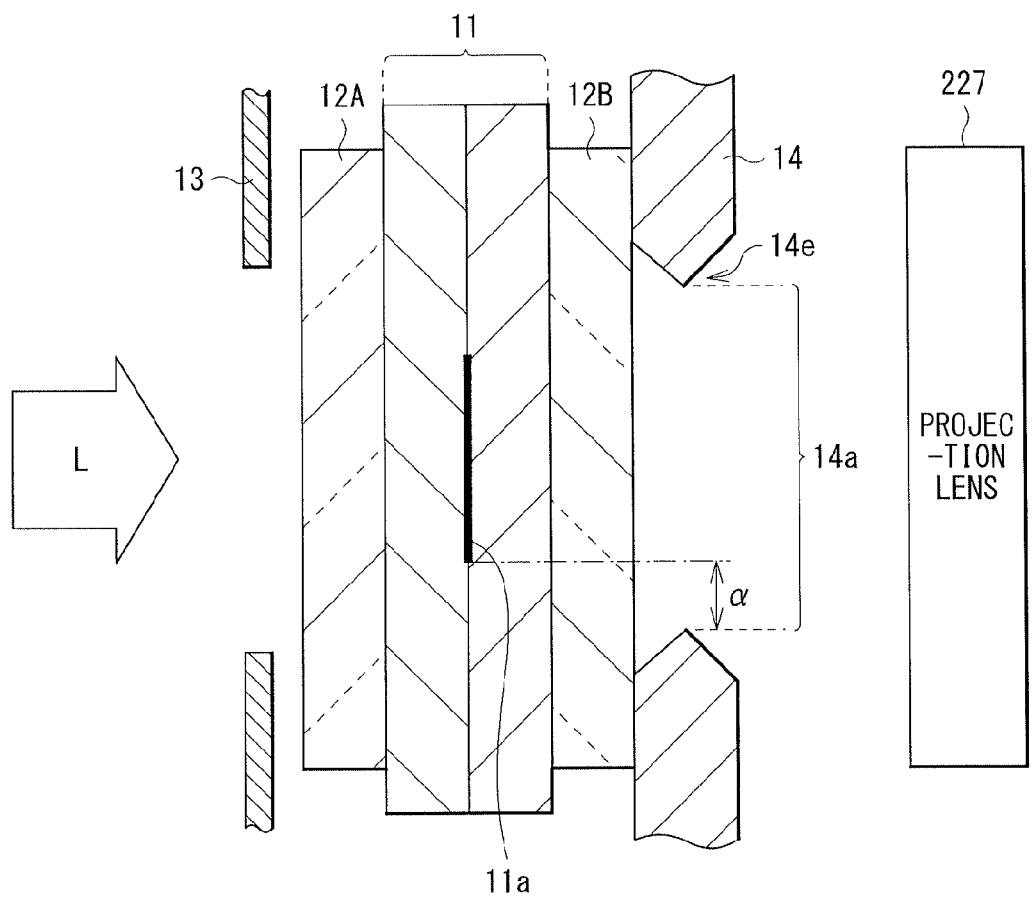
FIG. 4 is a schematic sectional diagram illustrating a configuration of a relevant part of the liquid crystal display device illustrated in FIG. 1.
Figure 5:
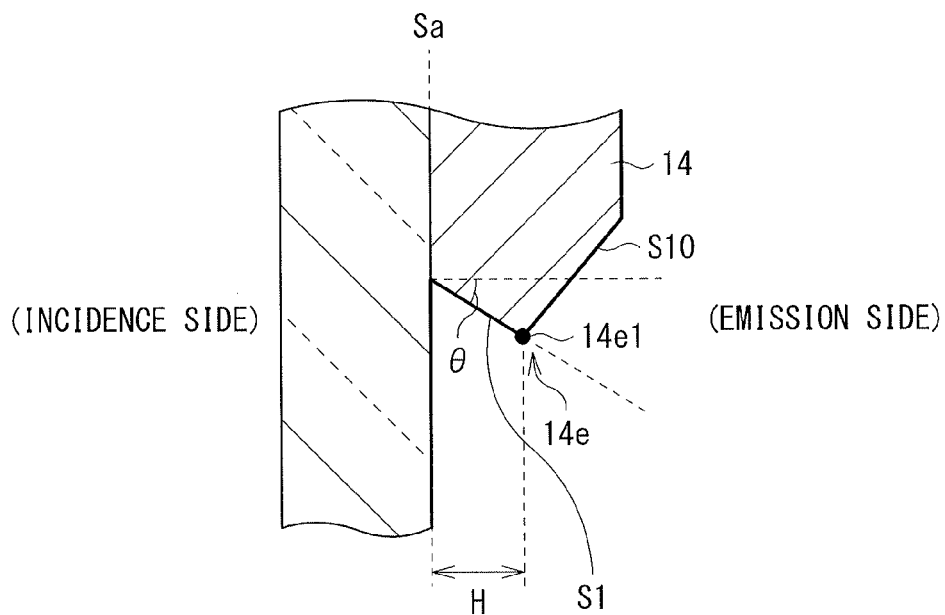
FIG. 5 is an expanded sectional diagram illustrating the neighborhood of an edge portion of an outer frame of the liquid crystal display device illustrated in FIG. 1.

FIG. 4 illustrates a sectional configuration of a relevant part of the liquid crystal display unit 10. FIG. 5 illustrates the neighborhood of an edge portion of the outer frame in an enlarged manner. In this embodiment, an edge portion 14e of an opening 14a of the outer frame 14 has a slope S1 facing the liquid crystal panel 11. The slope S1 is a surface that is nonparallel and non-orthogonal to the light emission surface of the liquid crystal panel 11 (in detail, a light emission surface Sa of the emission-side dustproof glass 12B), and is unopposed to (does not face) the projection lens 227. Here, the slope S1 is a plane, as an example of such a surface, extending along a direction at an angle θ relative to a perpendicular to the light emission surface Sa. The height H of the edge portion 14e may be desirably 80 μm or less as in a Modification (Modification 2) described later. For example, the angle θ may be an acute angle of 0 to 90°.

The edge portion 14e of the outer frame 14 also has a slope S10 on a light emission side due to a manufacturing process of the outer frame 14. The height H of the edge portion 14e corresponds to a distance between the light emitting surface Sa and a portion (bent portion 14e1) of the edge portion 14e, the portion projecting toward the inside of the opening 14a. Here, the height H of the edge portion 14e is equal to the height of the slope S1.

Figure 6:
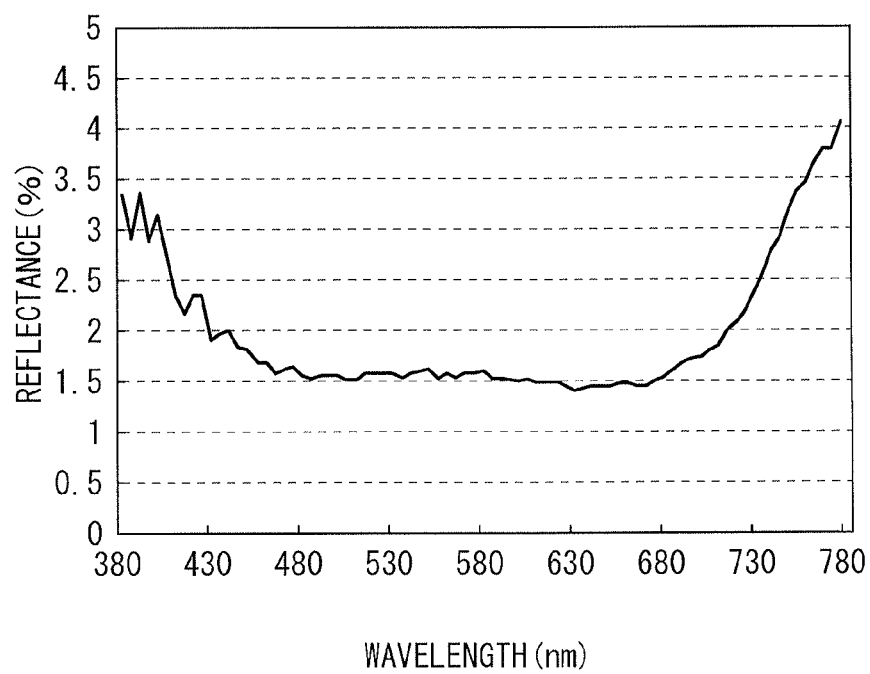
FIG. 6 is a characteristic diagram for explaining a reflectance at the edge portion of the outer frame of the liquid crystal display device illustrated in FIG. 1.
Figure 7:
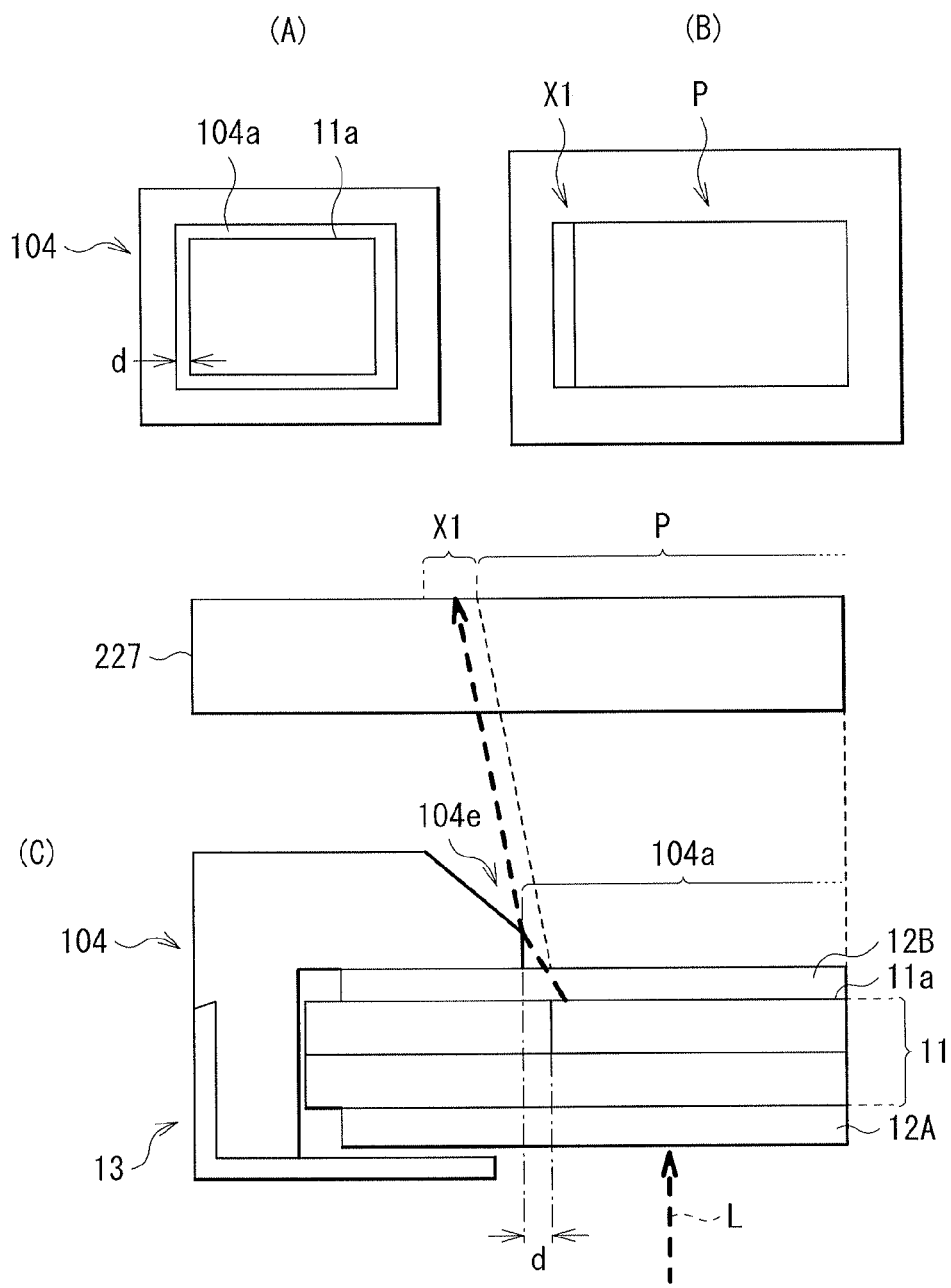
FIGS. 7A to 7C are schematic diagrams for explaining edge reflection.

In this embodiment, at least the edge portion 14e of the outer frame 14 is configured of a low-reflection material. A material having a reflectance of less than 1.5% to green light (wavelength: 495 nm to 570 nm both inclusive) is selected as the low-reflection material. FIG. 6 illustrates a relationship of reflectance (%) of an outer-frame material being generally used to various wavelengths containing green light. In this embodiment, a low-reflection material having a reflectance lower than an existing reflectance (about 1.5%) to green light is used for at least the edge portion 14e of the outer frame 14. In this specification, "reflectance" refers to a ratio of energy of reflected light to energy of incident light (energy of reflected light/energy of incident light) in percentage in the case where light (the above-described green light) perpendicularly enters a surface of an object from a vacuum.

Specifically, examples of a compositional material of the outer frame 14 may include aluminum (Al), silver (Ag), magnesium (Mg), and titanium (Ti), and alloys thereof. The outer frame 14 may be configured such that such a metal material is formed into a shape of the outer frame according to the above-described procedure, and then the slope S1 of the edge portion 14e is covered by a thin film made of the low-reflection material having the reflectance as described above. Examples of a formation process of the thin film may include film formation of chromium (Cr), etc. by plating, for example. Alternatively, the slope S1 may be subjected to chemical treatment such as alumite treatment, for example. Furthermore, a black or gray acrylic resin, etc. may be applied onto the slope S1, or a film made of a black or gray acrylic resin, etc. may be bonded to the slope S1. Alternatively, the outer frame 14 itself may be configured of the low-reflection material.

[Functions and Advantageous Effects]

Functions and effects of the projection display 1 described as above are now described with reference to FIG. 7A to FIG. 13B.

In the projection display 1, the red light LR, the green light LG, and the blue light LB based on white light emitted from the light source 211 are modulated by the respective corresponding liquid crystal display units 10R, 10G, and 10B. Subsequently, color light corresponding to an image is emitted from each of the liquid crystal display units 10R, 10G, and 10B, and such emitted color light are synthesized by the cross prism 226, and then such synthesized color light is projected onto the screen 228 by the projection lens 227 in an enlarged manner. In this way, image display is performed.

Figure 8:
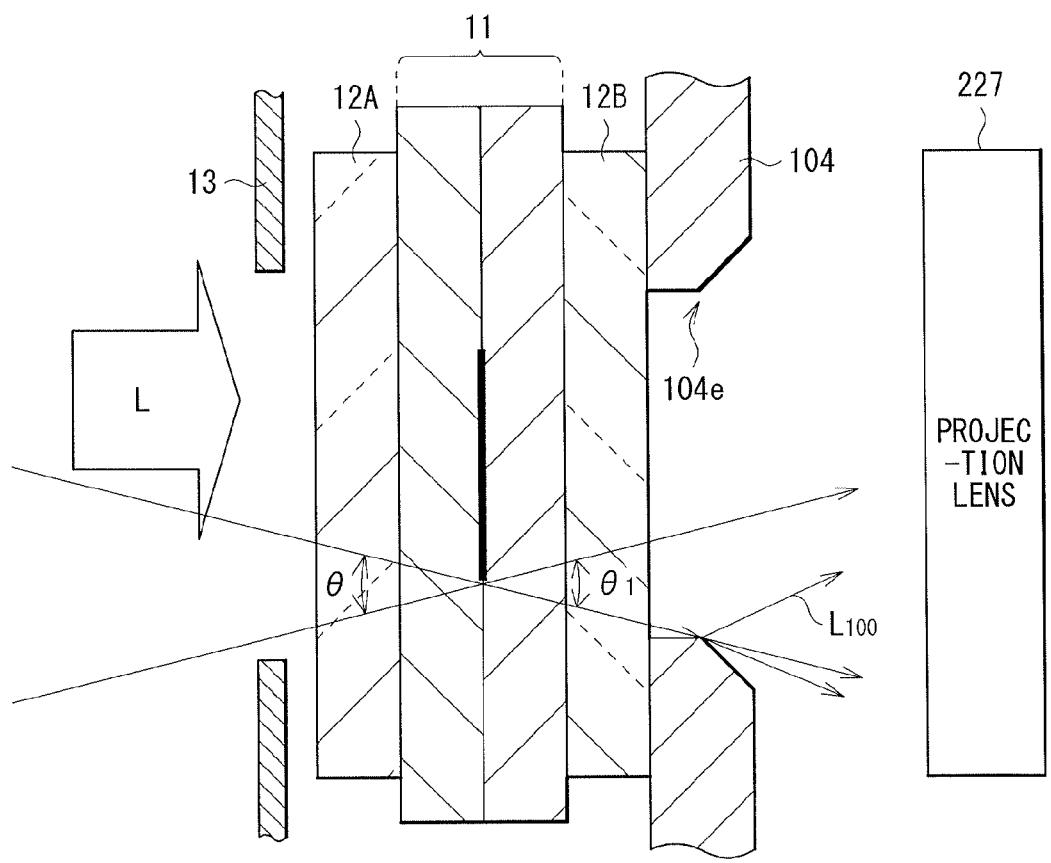
FIG. 8 is a schematic diagram for explaining edge reflection.
Figure 9:
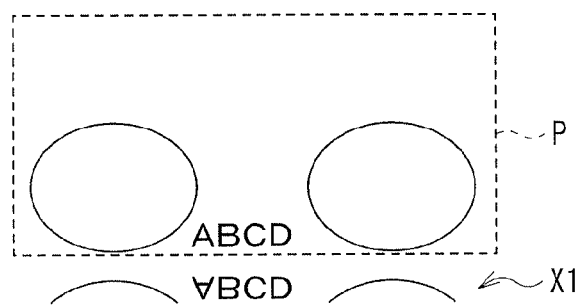
FIG. 9 is a schematic diagram illustrating an example of a display image in which edge reflection occurs.
Figure 10:
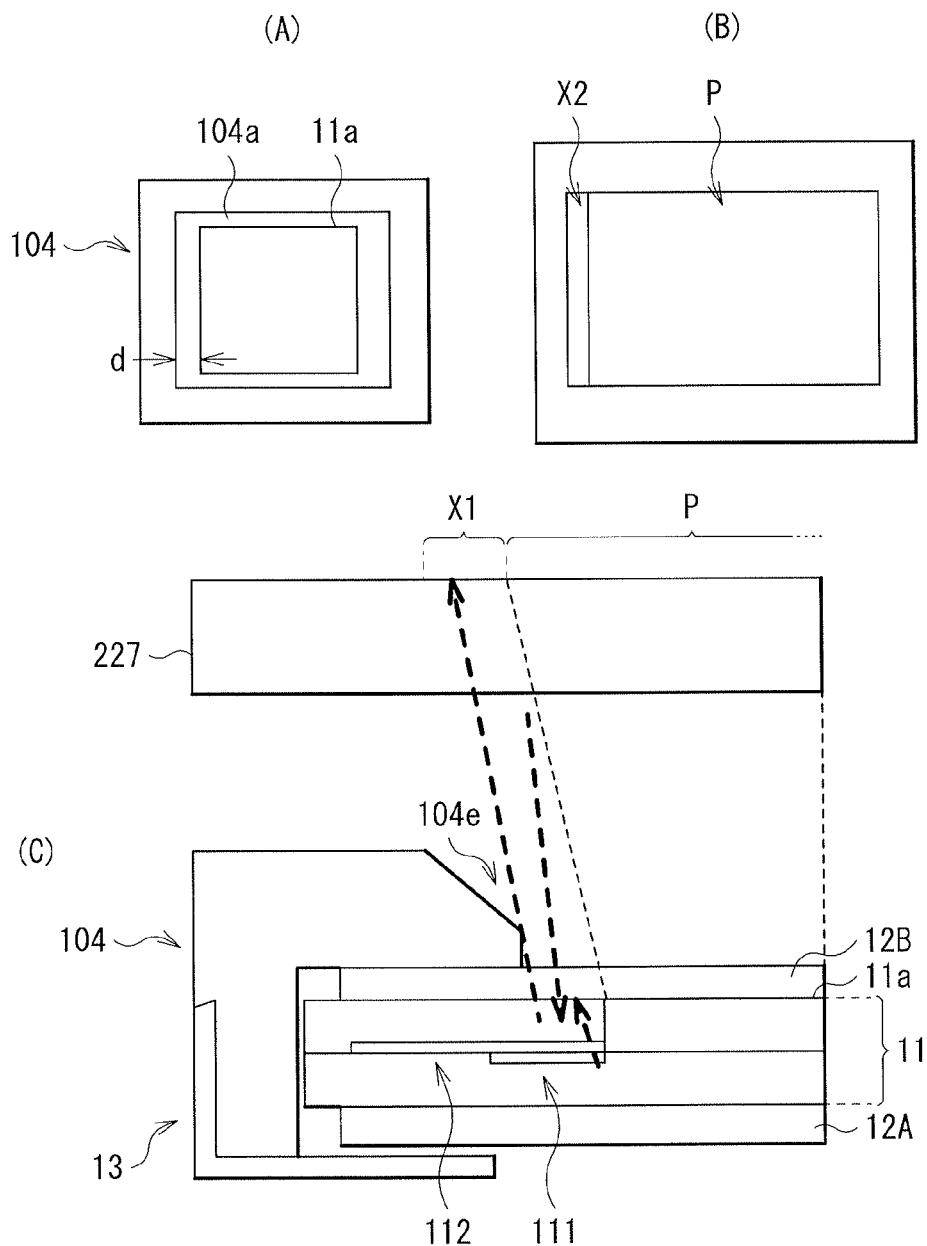
FIGS. 10A to 10C are schematic diagrams for explaining circuit reflection.

An edge reflection phenomenon caused by the outer frame (an outer frame 104) according to a comparative example of this embodiment is now described with reference to FIGS. 7A to 7C. As illustrated in FIG. 7A, the outer frame 104 has an opening 104a opposed to the effective pixel region 11a of the liquid crystal panel 11. As illustrated in FIGS. 7B and 7C, if a distance d between an end portion 104e of the outer frame 104 and the effective pixel region 11a is small, the following phenomenon occurs: an image X1 caused by light reflected at the end portion 104e reflects on the periphery of a projection image P. The reason for this is as follows. Specifically, as illustrated in FIG. 8, incident light L contains light to enter obliquely with respect to the perpendicular to the light incidence surface of the liquid crystal panel 11; hence, for example, part of light, the light passing through a pixel disposed at an end portion of the effective pixel region 11a, may be reflected by the end portion 104e. For example, as illustrated in FIG. 9, if such reflected light $L_{100}$ enters the projection lens 227, the image X1, which shows the neighborhood of an end portion of the projection image P in an inverted manner, is disadvantageously projected.

On the other hand, as illustrated in FIG. 10A, a large distance d is possibly established between the end portion 104e and the effective pixel region 11a in order to avoid such an edge reflection phenomenon. In such a case, however, as illustrated in FIGS. 10B and 10C, a circuit reflection phenomenon occurs. The reason for this is as follows. Specifically, incident light L passes through the liquid crystal panel 11 and then partially returns to the liquid crystal panel 11, i.e., return light exists. The liquid crystal panel 11 has a circuit section 112 for pixel drive in a peripheral region of the effective pixel region. If the distance d is large, the circuit section 112 is exposed from the outer frame 104, and is irradiated with such return light. Consequently, an image X2 of the circuit section 112 is disadvantageously projected onto the periphery of the projection image P.

Figure 11:
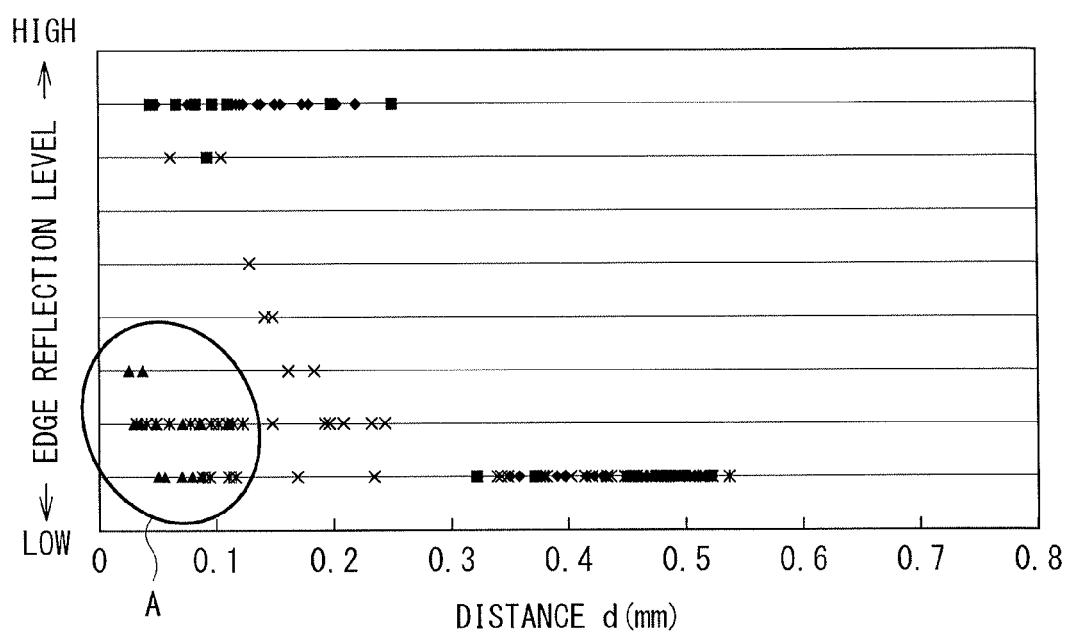
FIG. 11 is a characteristic diagram illustrating an edge reflection level in the case of using each of a low-reflection material, an existing material, and a high-reflection material for the outer frame.

In contrast, in this embodiment, first, at least the edge portion 14e (slope S1) of the outer frame 14 is formed of a low-reflection material as described above, and thus even if the distance d between the edge portion 14e and the effective pixel region 11a is reduced, the edge reflection phenomenon is suppressed. FIG. 11 illustrates respective sensory evaluation results of edge reflection levels in a case of using a low-reflection material (a material having a reflectance of less than 1.5% to green light) (a portion enclosed by A in the drawing), in a case of using an existing material (a material having a reflectance of 1.5% to green light), and in a case of using a high-reflection material (a material having a reflectance of 5% to green light), as Examples of this embodiment. The horizontal scale indicates the distance d (mm). As seen in the drawing, this embodiment in which the low-reflection material (a material having a reflectance of less than 1.5% to green light) is used shows a low edge reflection level. This shows suppression of degradation in image quality caused by light reflected by the edge portion 14e. In addition, this advantageously reduces the width of the outer frame 14 or the size of the opening 14a without occurrence of circuit reflection, thereby leading to improvement in degree of freedom of design layout.

Figure 12:
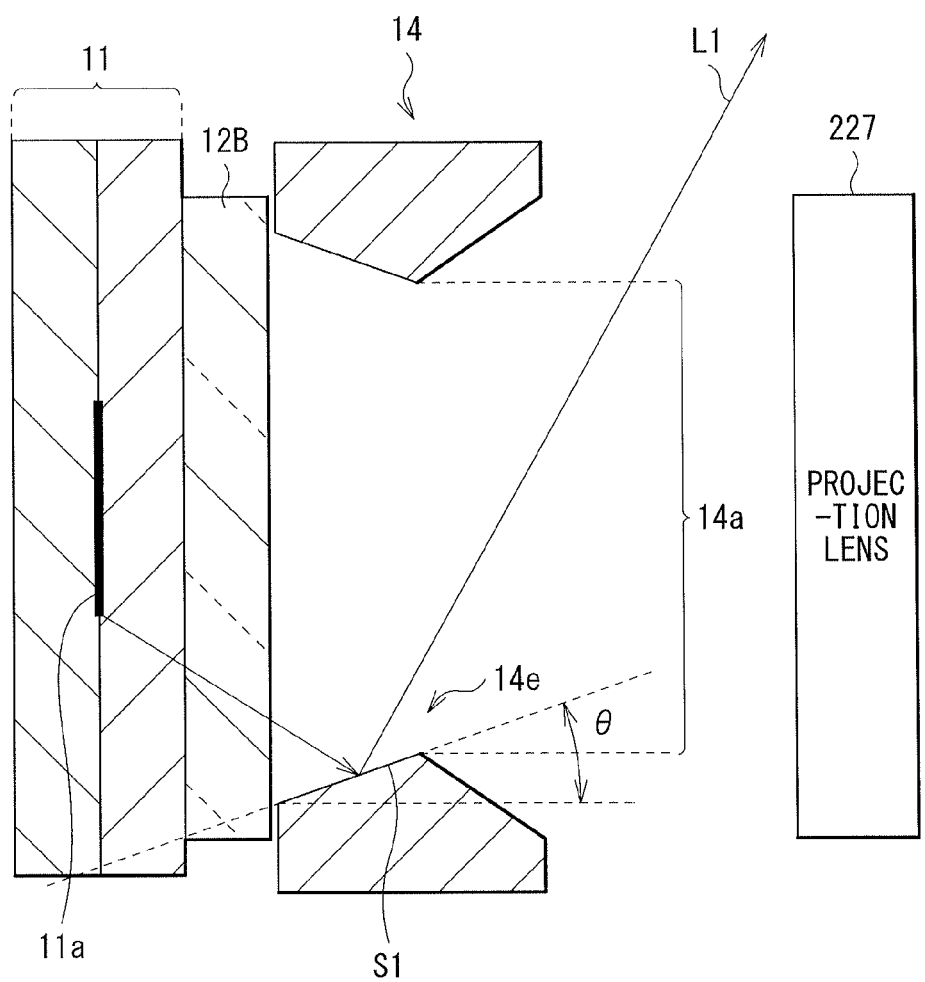
FIG. 12 is a schematic diagram for explaining a function of a slope (plane) of the edge portion of the outer frame.
Figure 13A:
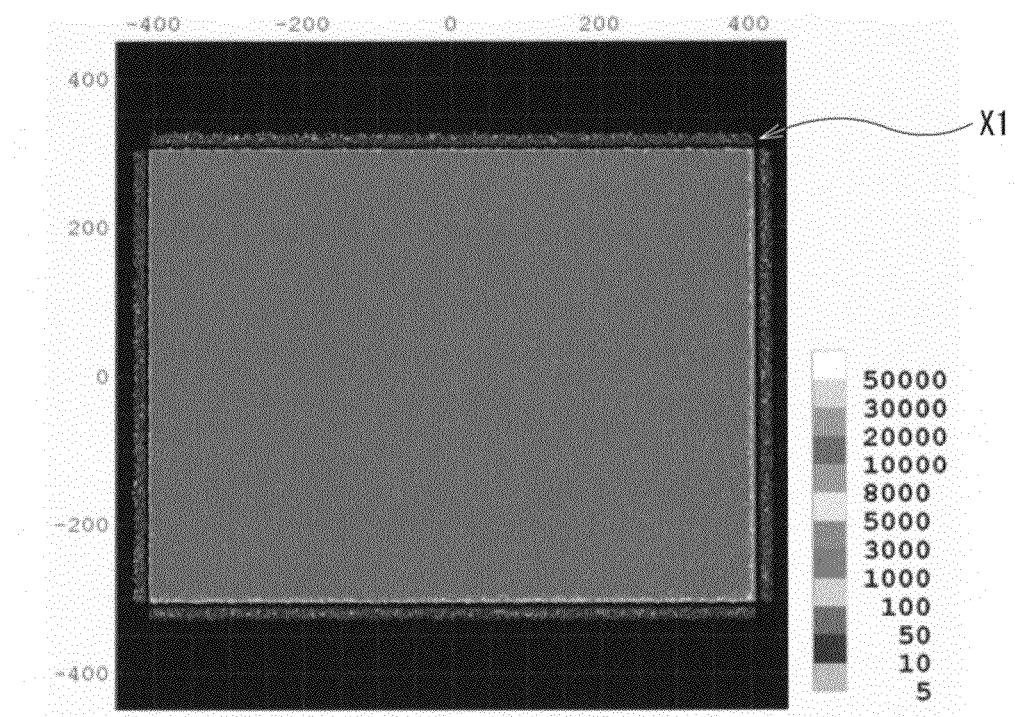
FIGS. 13A and 13B illustrate simulation results of edge reflection in the case of providing no slope in the edge portion of the outer frame and in the case of providing the slope (plane) therein, respectively.
Figure 13B:
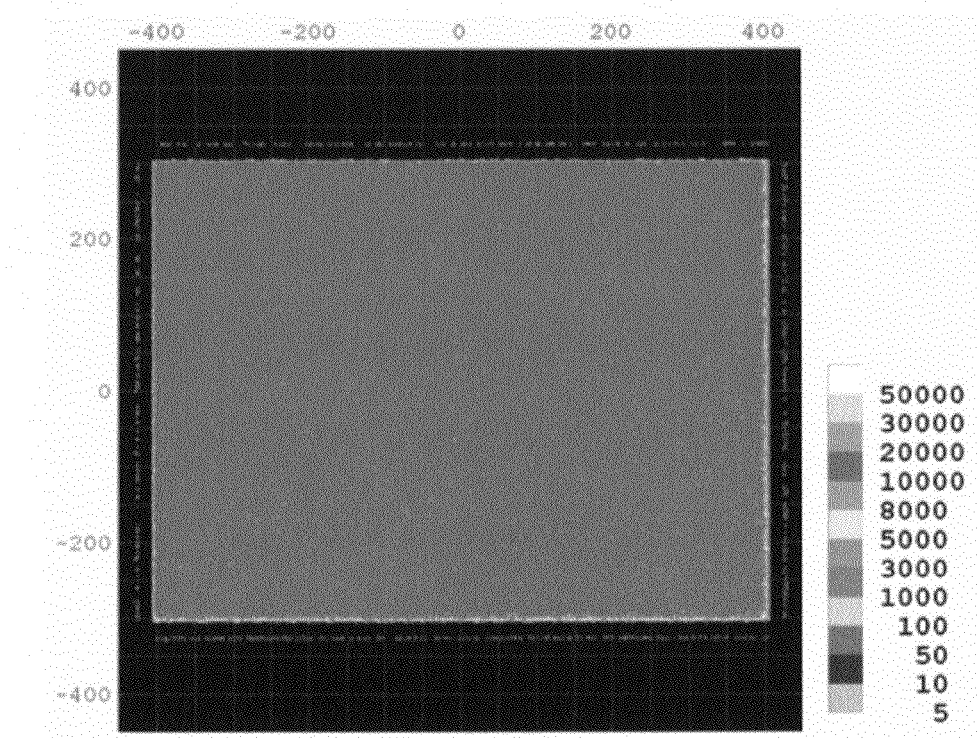

Moreover, in this embodiment, the edge portion 14e of the outer frame 14 has the slope S1 (plane) inclining at a predetermined angle θ; hence, the following merit is given. Specifically, as illustrated in FIG. 12, when part of light emitted from the effective pixel region 11a of the liquid crystal panel 11 enters the edge portion 14e of the outer frame 14, such incident light is reflected by the slope S1 while being greatly changed in optical path thereof. Consequently, light L1 reflected by the slope S1 is less likely to enter the projection lens 227. FIG. 13A illustrates a simulation result of a projection image in the case of the edge portion 14e having no slope (θ=0°). FIG. 13B illustrates a simulation result of a projection image in the case of the edge portion 14e having the slope S1 (θ=5°). These results show that edge reflection is more reduced in the case of the edge portion 14e having the slope S1.

As described hereinbefore, in this embodiment, the edge portion 14e of the opening 14a of the outer frame 14, which is provided on the light emission side of the liquid crystal panel 11, is formed of a low-reflection material having a reflectance of 1.5% or less to green light. Therefore, an amount of light reflected by the edge portion 14e of the outer frame 14, of light emitted from the liquid crystal panel 11, is reduced, which makes it possible to reduce reflection in a projection image caused by such reflected light.

Moreover, the edge portion 14e of the outer frame 14 has the slope 51 facing the light emission surface of the liquid crystal panel 11. Therefore, an optical path of light reflected by the edge portion 14e of the outer frame 14, of light emitted from the liquid crystal panel 11, is changed, which makes it possible to reduce reflection in a projection image caused by such reflected light.

As a result, it is possible to suppress occurrence of degradation in image quality caused by the outer frame 14 provided on the light emission side of the liquid crystal panel 11.

Description is now made on Modifications (Modifications 1 and 2) of the outer frame 14 of the liquid crystal display unit 10 in the above-described embodiment. An outer frame 14 described below is also attached to the liquid crystal panel 11 in the above-described embodiment, and components similar to those of the projection display 1 are designated by the same numerals, and description thereof is appropriately omitted.

[Modification 1]

Figure 14:
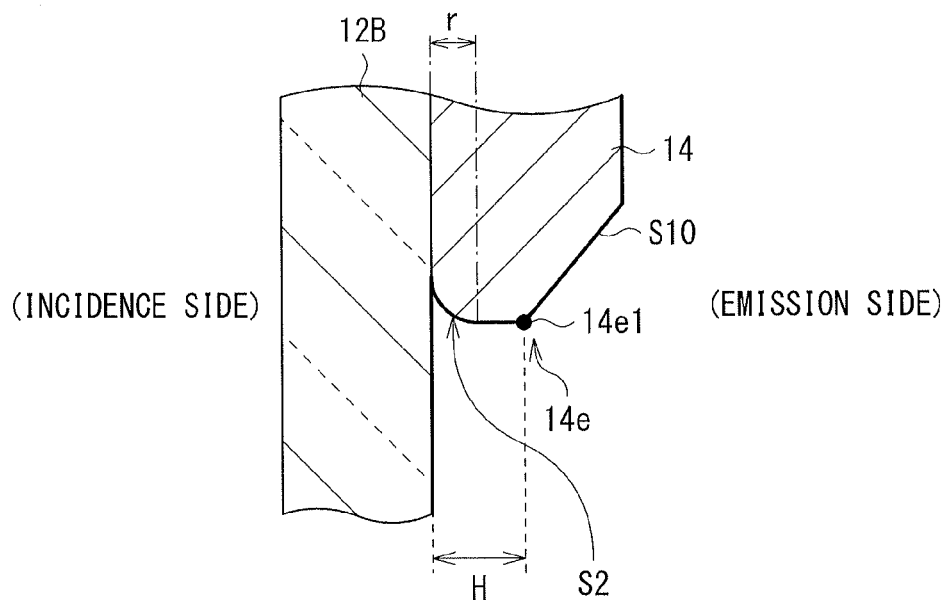
FIG. 14 is an expanded sectional diagram illustrating the neighborhood of an edge portion of an outer frame of a liquid crystal display device according to Modification 1.

FIG. 14 is an expanded sectional diagram illustrating the neighborhood of the outer frame 14 according to Modification 1. As shown in the Modification 1, the edge portion 14e of the outer frame 14 may have a slope S2 including a curved surface. The slope S2 corresponds to part (a portion corresponding to a height r) of the edge portion 14e, the part being provided with a curvature R, and may be formed over part (r<H) or the entire (r=H) of the incidence side of the bent portion 14e1. In this case, as with the slope S1 (plane) in the above-described embodiment, light entering from a liquid crystal panel 11 is allowed to be reflected while being greatly changed in optical path of the light; hence, effects similar to those in the above-described embodiment are obtainable.

Figure 15A:
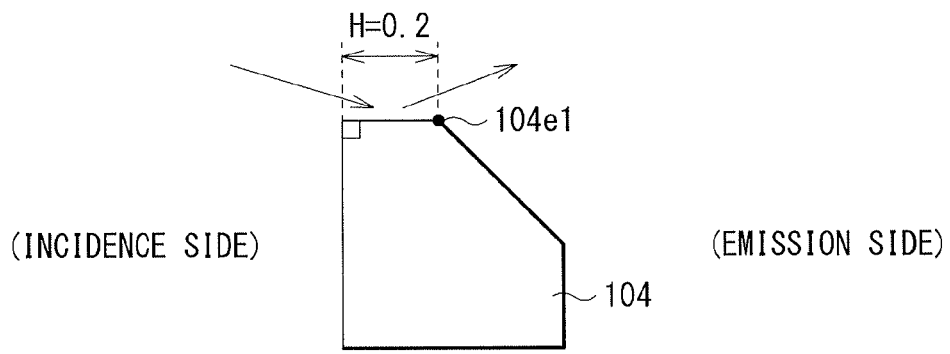
FIGS. 15A and 15B are schematic diagrams for explaining a configuration of the edge portion of the outer frame used in simulation of the liquid crystal display device illustrated in FIG. 14.
Figure 15B:
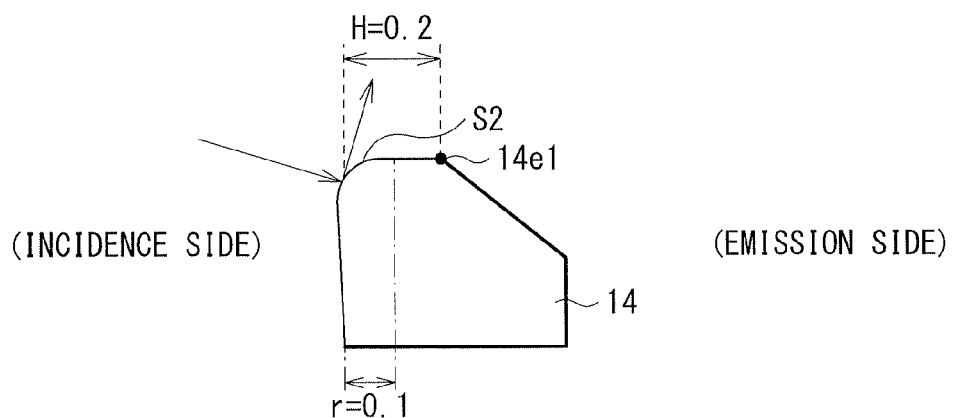
Figure 16A:
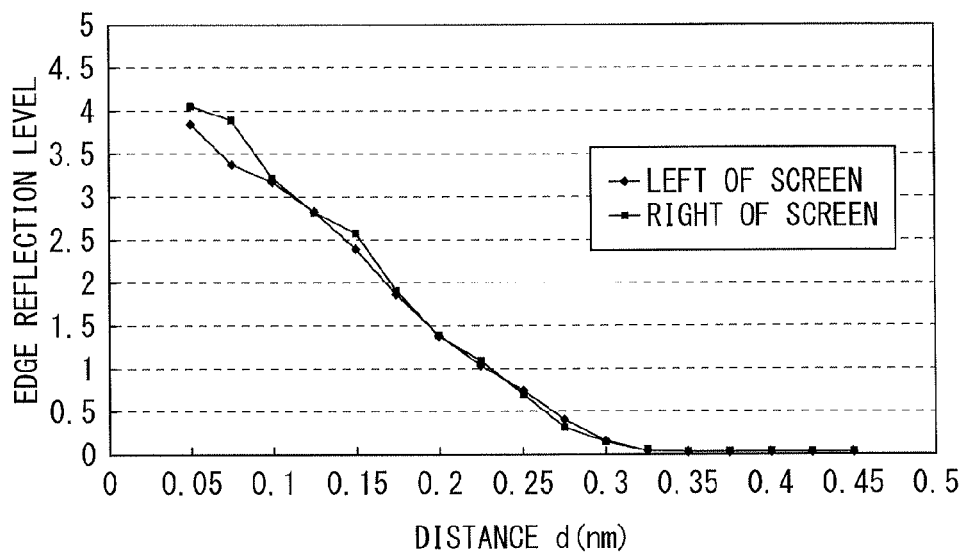
FIGS. 16A and 16B illustrate simulation results of edge reflection in the case of providing no slope in the edge portion of the outer frame and in the case of providing a slope (curved surface) therein, respectively.
Figure 16B:
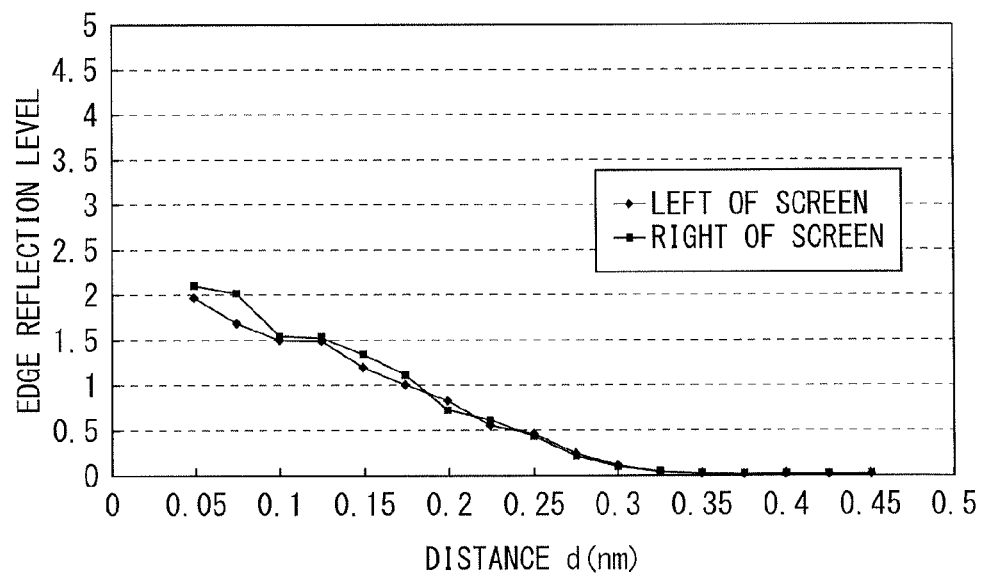

The edge reflection level of each of the outer frame 14 having such a slope S2 and the outer frame 104 with no curvature was determined by simulation. As illustrated in FIG. 15A, the outer frame 104 was assumed to have a height H of 0.2 up to the bent portion 140e1. As illustrated in FIG. 15B, the outer frame 14 was assumed to have a height H of 0.2 up to the bent portion 14e1 and a height r of the curved surface S2 of 0.1. FIG. 16A illustrates a simulation result of an edge reflection level in the case of the outer frame 104 having no curvature. FIG. 16B illustrates a simulation result of an edge reflection level in the case of the outer frame 14 having the slope S2. These results show that edge reflection is more reduced in the case of the outer frame 14 having the slope S2.

[Modification 2]

Figure 17:
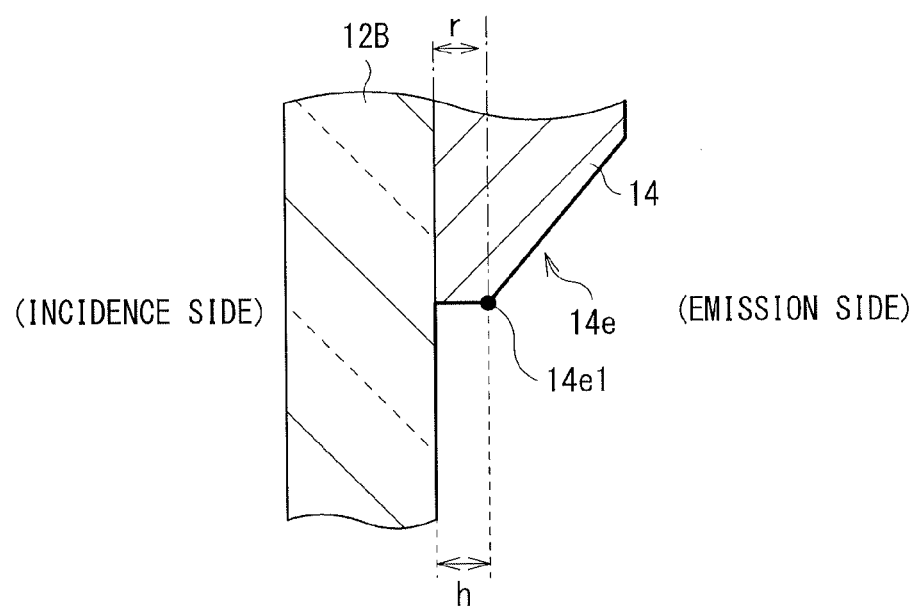
FIG. 17 is an expanded sectional diagram illustrating the neighborhood of an edge portion of an outer frame of a liquid crystal display device according to Modification 2.

FIG. 17 is an expanded sectional diagram illustrating the neighborhood of an outer frame 14 according to Modification 2. As shown in the Modification 2, even if the edge portion 14e of the outer frame 14 does not have the slope (S1 or S2) including a plane or a curved surface as described above, and if the height H of the edge portion 14e has a sufficient small value, for example, 80 μm or less (H=h<80 μm), effects substantially similar to those in the above-described embodiment are obtainable.

Figure 18:
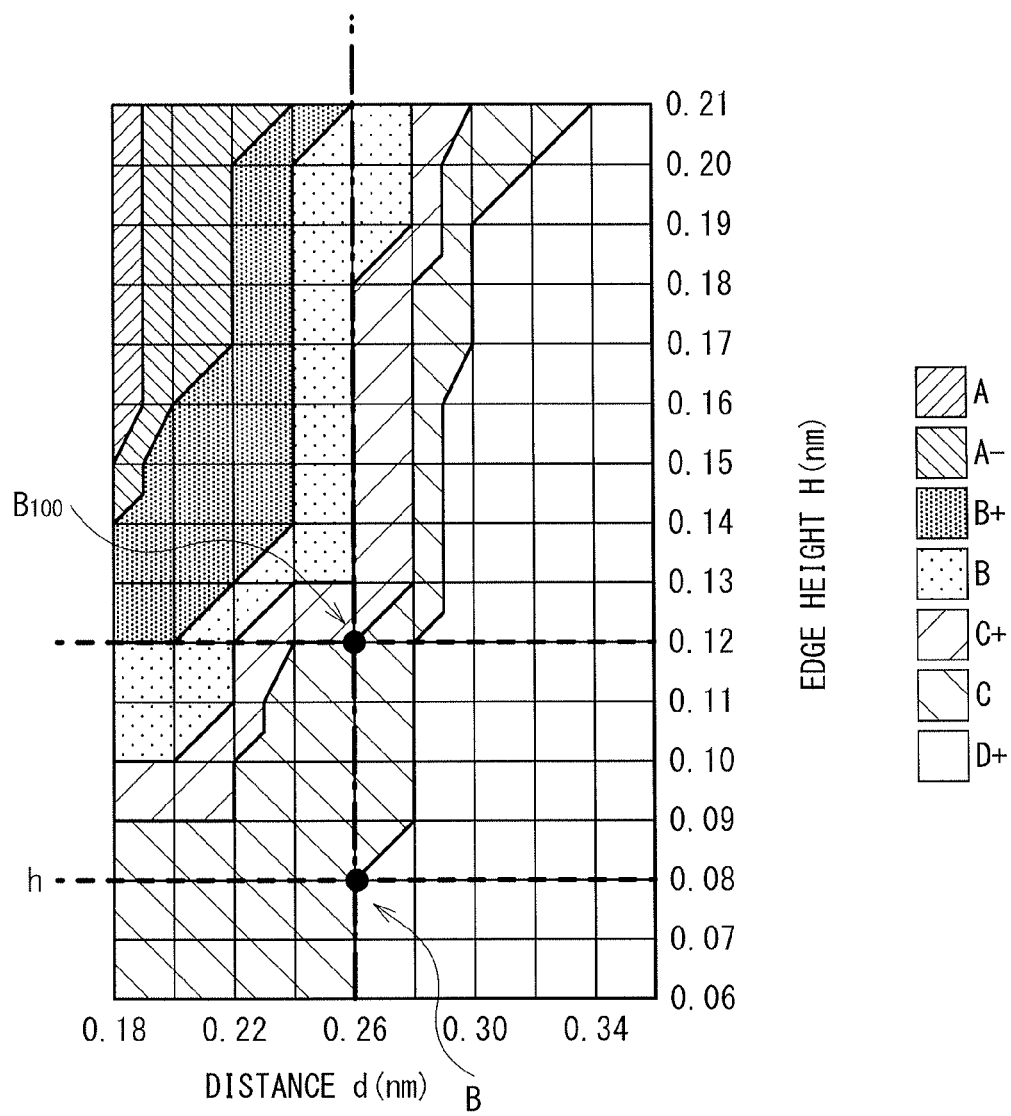
FIG. 18 is a characteristic diagram for explaining an optimal value of height of the edge portion of the outer frame illustrated in FIG. 17.

FIG. 18 illustrates sensory evaluation results of edge reflection in the case of varying each of the distance d and the height h of the outer frame 14 illustrated in FIG. 17. Evaluation is made in seven ranks, i.e., A, A−, B+, B, C+, C, and D+, where the A rank represents a highest reflection level (large degradation in image quality), and the D+ rank represents a lowest reflection level (small degradation in image quality). In general, a maximum allowable distance d of circuit reflection is 0.26 mm. The height H of the existing outer frame 104 may be, for example, 0.12 mm. Hence, an existing edge reflection level is at the C+rank (see $B_{100}$ in the drawing), i.e., is at an allowable limit. In contrast, the height H is adjusted to satisfy H=h=80 μm (0.08 mm), and thus the reflection level is at the D+ rank (see B in the drawing), i.e., the reflection level is allowed to be lowered to an invisible level. Moreover, when the height H is adjusted to be 80 μm or less, for example, even if the distance d is further decreased to 0.18 mm, the reflection level may be maintained at the C rank so that image quality may be promisingly improved compared with the existing level.

Although the present disclosure has been described with the embodiment and the Modifications thereof hereinbefore, the disclosure is not limited thereto, and various modifications or alterations may be made. For example, although the edge portion 14e, which is formed of the low-reflectance material and has the slope (S1 or S2), of the outer frame 14 has been exemplified in the above-described embodiment, those are not necessarily indispensable at the same time. Specifically, even if the edge portion 14e has no slope, and if the edge portion 14e is formed of a low-reflectance material, the effects of the liquid crystal display (1) and of the projection display (1) according to embodiments of the present disclosure are obtained. In addition, even if the edge portion 14e is nor formed of the low-reflectance material, and if the edge portion 14e has the slope S1, the effects of the liquid crystal display (2) and of the projection display (2) according to embodiments of the present disclosure are obtained.

Moreover, a transmissive liquid crystal display unit has been exemplified as the liquid crystal display according to an embodiment of the present disclosure in the above-described embodiment and Modifications, the liquid crystal display of an embodiment of the present disclosure is not limited thereto, and may be a reflective liquid crystal display unit such as liquid crystal on silicon (LCOS), for example.

Furthermore, the projection display according to an embodiment of the present disclosure is not limited to the projection display having the configuration described in the above-described embodiment, and is applicable to any of various display of a type where light from a light source is modulated through a liquid crystal display unit for image display using a projection lens.

It is to be noted that the disclosure may be configured as follows.

(1) A liquid crystal display, including:
  a liquid crystal panel containing an effective pixel region that is configured to emit light corresponding to an image; and
  a frame member provided on a light emission side of the liquid crystal panel, and having an opening opposed to the effective pixel region of the liquid crystal panel,
  wherein an edge portion of the opening of the frame member is formed of a low-reflection material having a reflectance of less than about 1.5% to green light.
(2) The liquid crystal display according to (1), wherein the edge portion of the frame member has a slope facing a light emission surface of the liquid crystal panel.
(3) The liquid crystal display according to (2), wherein the slope is a plane forming an acute angle with a perpendicular to the light emission surface.
(4) The liquid crystal display according to (2), wherein the slope is a curved surface.
(5) The liquid crystal display according to any one of (1) to (4), wherein at least the edge portion of the frame member is covered with a thin film formed of the low-reflection material.
(6) The liquid crystal display according to any one of (1) to (5), wherein the frame member is configured of the low-reflection material.
(7) The liquid crystal display according to any one of (1) to (6), wherein the edge portion of the frame member has a height of about 80 μm or less.
(8) The liquid crystal display according to any one of (1) to (7), wherein the liquid crystal panel is of a transmissive type.
(9) A liquid crystal display, including:
  a liquid crystal panel containing an effective pixel region that is configured to emit light corresponding to an image; and
  a frame member provided on a light emission side of the liquid crystal panel, and having an opening opposed to the effective pixel region of the liquid crystal panel,
  wherein an edge portion of the opening of the frame member has a slope facing a light emission surface of the liquid crystal panel.
(10) The liquid crystal display according to (9), wherein the slope is a plane forming an acute angle with a perpendicular to the light emission surface.
(11) The liquid crystal display according to (9), wherein the slope is a curved surface.
(12) A projection display, including:
  a light source;
  a liquid crystal panel containing an effective pixel region that is configured to modulate light from the light source to emit light corresponding to an image;
  a frame member provided on a light emission side of the liquid crystal panel, and having an opening opposed to the effective pixel region of the liquid crystal panel; and
  a projection lens projecting the image based on light emitted from the liquid crystal panel, wherein an edge portion of the opening of the frame member is formed of a low-reflection material having a reflectance of less than about 1.5% to green light.

(13) A projection display, including:
- a light source;
- a liquid crystal panel containing an effective pixel region that is configured to modulate light from the light source to emit light corresponding to an image;
- a frame member provided on a light emission side of the liquid crystal panel, and having an opening opposed to the effective pixel region of the liquid crystal panel; and
- a projection lens projecting the image based on light emitted from the liquid crystal panel, wherein an edge portion of the opening of the frame member has a slope facing a light emission surface of the liquid crystal panel.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display, comprising:
   a liquid crystal panel containing an effective pixel region that is configured to emit light corresponding to an image; and
   a frame member provided on a light emission side of the liquid crystal panel, and having an opening opposed to the effective pixel region of the liquid crystal panel,
   wherein,
      an edge portion of the opening of the frame member is formed of a low-reflection material having a reflectance of less than about 1.5% to green light,
      the edge portion of the frame member has a slope facing a light emission surface of the liquid crystal panel, and
      the slope is a plane forming an acute angle with a perpendicular to the light emission surface.

2. The liquid crystal display according to claim 1, wherein at least the edge portion of the frame member is covered with a thin film formed of the low-reflection material.

3. The liquid crystal display according to claim 1, wherein the frame member is configured of the low-reflection material.

4. The liquid crystal display according to claim 1, wherein the edge portion of the frame member has a height of about 80 μm or less.

5. The liquid crystal display according to claim 1, wherein the liquid crystal panel is of a transmissive type.

6. A liquid crystal display, comprising:
   a liquid crystal panel containing an effective pixel region that is configured to emit light corresponding to an image; and
   a frame member provided on a light emission side of the liquid crystal panel, and having an opening opposed to the effective pixel region of the liquid crystal panel,
   wherein,
      an edge portion of the opening of the frame member has a slope facing a light emission surface of the liquid crystal panel, and
      the slope is a plane forming an acute angle with a perpendicular to the light emission surface.

7. A projection display, comprising:
   a light source;
   a liquid crystal panel containing an effective pixel region that is configured to modulate light from the light source to emit light corresponding to an image;
   a frame member provided on a light emission side of the liquid crystal panel, and having an opening opposed to the effective pixel region of the liquid crystal panel; and
   a projection lens projecting the image based on light emitted from the liquid crystal panel,
   wherein,
      an edge portion of the opening of the frame member is formed of a low-reflection material having a reflectance of less than about 1.5% to green light,
      the edge portion of the frame member has a slope facing a light emission surface of the liquid crystal panel, and
      the slope is a plane forming an acute angle with a perpendicular to the light emission surface.

8. A projection display, comprising:
   a light source;
   a liquid crystal panel containing an effective pixel region that is configured to modulate light from the light source to emit light corresponding to an image;
   a frame member provided on a light emission side of the liquid crystal panel, and having an opening opposed to the effective pixel region of the liquid crystal panel; and
   a projection lens projecting the image based on light emitted from the liquid crystal panel,
   wherein,
      an edge portion of the opening of the frame member has a slope facing a light emission surface of the liquid crystal panel, and
      the slope is a plane forming an acute angle with a perpendicular to the light emission surface.

* * * * *